United States Patent [19]

Nozaki et al.

[11] 4,025,956
[45] May 24, 1977

[54] PRINTING MACHINE
[75] Inventors: Tetsuzo Nozaki, Kyoto; Yoshihisa Ogawa, Nagaokakyo, both of Japan
[73] Assignee: Nozaki Insatsu Shigyo Kabushiki Kaisha, Kyoto, Japan
[22] Filed: Dec. 30, 1975
[21] Appl. No.: 645,476
[52] U.S. Cl. .............................. 360/2; 235/61.11 D; 101/67
[51] Int. Cl.² ................. G11B 13/02; G01D 15/00; G06K 7/08
[58] Field of Search ..................... 101/382 MV, 67; 235/61.11 D, 61.12 M, 61.7 B; 346/140 R, 74 M; 178/1, 23 A; 360/1, 2

[56] References Cited
UNITED STATES PATENTS

| 3,401,394 | 9/1968 | Leonard et al. | 235/61.11 D |
| 3,665,513 | 5/1972 | Benson et al. | 235/61.12 M |
| 3,855,457 | 12/1974 | Amundson et al. | 235/61.11 D |

OTHER PUBLICATIONS

"Rotating Head Magnetic Stripe Ticket Recorder and Printer", Price, IBM Tech. Discl. Bulletin, vol. 17, No. 3, Aug. 1974, pp. 946–947.

Primary Examiner—Thomas A. Robinson
Attorney, Agent, or Firm—Wenderoth, Lind & Ponack

[57] ABSTRACT

A printing machine for partially magnetized price tickets, labels, etc. which incorporates therein a single magnetic head or a pair of such heads for recording and reading of the magnetized faces of tickets. The magnetic head or heads can be movable horizontally and also be located right under a horizontally movable inking pad of the printing device to go back and forth together therewith. This printing machine can be constructed in a size almost the same as that of a conventional ticket printing machine. The printing machine according to the present invention, due to this mechanism, avoids the problems arising because the printing happens to be different from the recording and also assures the prevention of misrecording.

2 Claims, 5 Drawing Figures

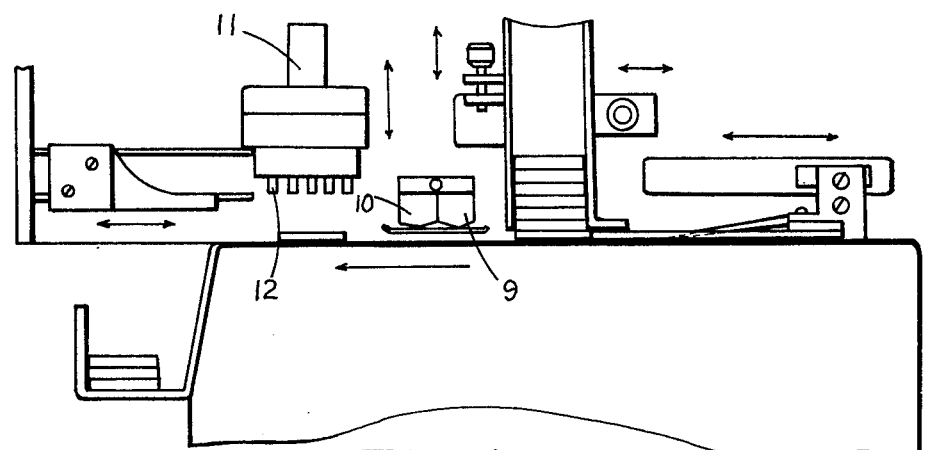
FIG.4
FIG.5
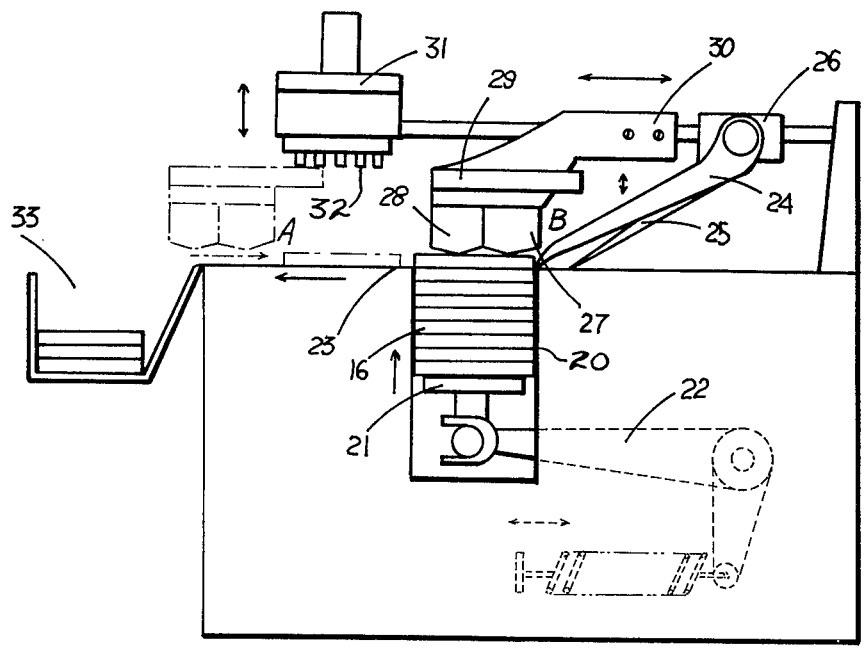

PRINTING MACHINE

The present invention relates to a printing machine for printing price tickets, labels, etc. (hereinafter called tickets) in which is combined the mechanism of a conventional ticket printing machine and that for magnetic recording which can be linked directly with a POS system.

In recent years, it has been a general practice to attach to commodities tickets manifesting the quality and price thereof to the customers who are about to buy them and by means of these tickets printed with such information, the quality and price of each commodity can be checked automatically and taken reaidly into a POS system.

There are various methods of recording for such checking, for instance, optically by the use of a spectrum or by utilising magnetic variation of magnetized face of the ticket.

However, there has hitherto been no method of doing the printing and magnetically recordng of information at one time by one and the same device. In doing these two kinds of jobs, tickets must firstly have information recorded thereon magnetically so as to make tham capable of being linked directly with a POS system and then printing is done thereon later thus requiring double the time and double the nunber of devices used.

In short, the present invention provides a printing machine having a recording mechanism utilising magnetic variation of the magnetized faces of tickets as one of the recording methods, so that information on the thus treated ticket can be linked directly with a POS system.

As is obvious from said fact, the object of the present invention is to provide a ticket printing machine which has both a mechanisms of a conventional ticket printing machine and the a recording device whih records information thereon by magnetic variation of the face of the ticket.

Further, the present invention seeks to provide a printing machine capable of performing two functions in a single operation yet having the same size as a conventional ticket printing machine.

Other objects and features of the invention will be made clear from the follwing description taken together with the accompanying drawings, in which:

FIG. 4 is a view similar to FIG. 3 showing a modified embodiment of the invention; and FIG. 5 is a view similar to FIG. 3 of another embodiment of the machine of the invention.

Figure 1:
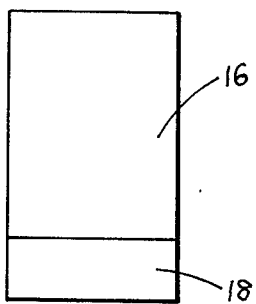
FIG. 1 shows a single ticket to be used in the printing machine of the invention.
Figure 2:
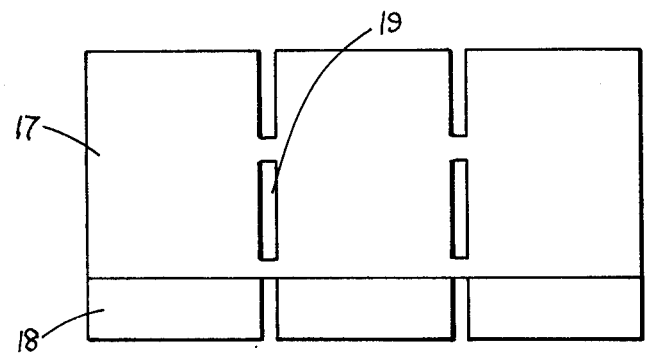
FIG. 2 shows continuous tickets to be used in the printing machine of the invention.

FIGS. 1 and 2 show, respectively, a single type ticket 16 and continuous tickets 17, the tickets each having a part 18 of the face magnetied, the continuous tickets also being separated by slits 19.

FIG. illustratesone embodiment of the invention having a recording mechanism recording information by magnetic variation of the magnetized faces of the tickets and capable of being linked directly with a POS system, the apparatus having a recording magnetic head 9 situated behind, in the direction of movement of tickets through the machine, a printing device 11. Explaining the mechanism in detail, a ticket box 1 for containing a stack of tickets 16 such as shown in FIG. 1, has one side constituted by a forming plate 2 which is adjustable to the right and left according to the sie of the tickets 16. The size of the ticket outlet (3) at the bottom of the box (1) can also be ajdusted to suit the thickness of ticket by means of an adjusting screw 4 which moves the box 1 relative to the base of the machine, A ticket forwarding bed plate 5 is provided onto which tickets are pushed out one by one by means of a claw 6 in the case of single type ticketsand by a claw 7 in the case of continuous tickets, these claws being fitted at one end to a claow holder 8 capable of moving back and forth along the plate 5. The claw 6 can be raised to some extend according to the thickness of the ticket. In place ofsaid bed plate 5, a king of belt conveyor can be utilised/

A magnetic recording head 9 for producing magnetic variation of the magnetized ticket face portion 18 can be directly linked with a POS system. A suitable clearance is provided between said magnetic head (9) and said bed plate 5 such that the forwarded single type ticket 16 can contact the head (9) yet without its movement being stopped. A ticket guide plate 15 is mounted on the bottom of head 9. The magnetic head 9 is mouted on the machine so as to be able to move slightly up and down so as to accommodate the thickness of the ticket bein printed. Although not illustrated, the magnetic head 9 has a conventional construction having a cored coil with a gap provided at its end.

A vertically reciprocating printing device 11 is provided ahead of the magnetic head 9 having type elements 12 thereon for printing tickets. An ink pad 13 is movable back and forth horizontally under the printing device for inking said type elements 12. A ticket receiver 14 is provided at the end of bed plate 5 to receive printed tickets.

Figure 3:
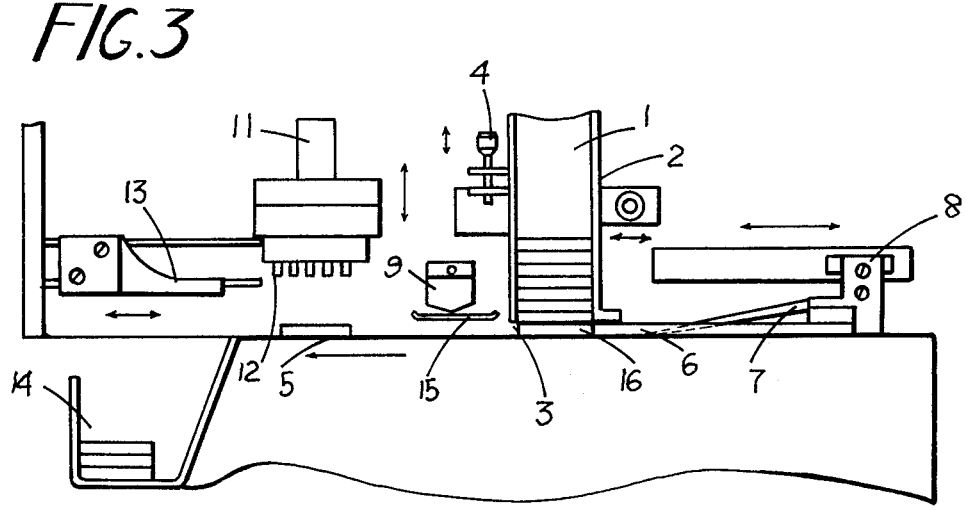
FIG. 3 is a diagrammatic side elevation of an embodiment of the machine of the invention.

FIG. 4 illustrates an embodiment of the invention similar to that of FIG. 3 but with a reading magnetic head (10) added ahead of the recording head 9.

FIG. 5 illustrates another embodiment of the invneton in which both the recording magnetic head and the reading magnetic head are movable horizontally and having a somewht modified arrangement of other component parts. A ticket box 20 contains a stack of single type tickets 16 placed on a ticket feeding plate 21 which in turn is connected to a spring lever 22 so as to be moved upward thereby. A ticket forwarding bed plate 23 is provided onto which the tickets are pushed out one by one by the claw 24 in case of single type ticket and by the claw 25 in case of continuous tickets, these claws being respectively mounted at one end on the claw holder 26 and being movable back and forth. Recording and reading magnetic heads 27 and 28, respectively, are mounted. side by side, the reading head 28 being positioned ahead of the recording head 27 in the forwarding direction of the tickets. Between these magnetic heads and sad bed plate 23, a suitable clearance is provided that the forwarded ticket will contact the bootom of said magnetic heads. An ink pad 29 mounted on the top of the heads are connected at one end to a magnetic head mover 30 which is horizontally reciprocable. A printing device 31 having printing type elements 32 on the bottom thereof is mounted on the machine so as to be movable vertically and is always located at such a position that its printing type elements 32 can be inked when the ink pad 29 is moved towards it by said magnetic head mover 30. A ticket receiver 33 is provided at the free end of the bed plate 23. The other parts of the machine ar similar to those illusstrated in FIG. 3 and FIG. 4.

The embodiments of the invention hithereto shown by each figure are so constructed as to have the recording magnetic head positioned ahead of the printingdevice. It is not necessary that the invention be limited to such a arrangement and the magnetic head can naturally be positioned at the rear of the printing device.

The operation of the invention will now be described. Referring to FIG. 3, in case of single type ticket, the ticket box 1 must firstly be adjusted to contain therein a heap of the tickets by adjusting the forming plate 2 to suit the ticket size adjusting the clearance of the ticket outlet 3 to suit the thickness of the ticket by means of the adjusting screw 4. After this adjustment, when the printing device is connected to an electric source (not illustrated), the ticket forwarding claw 6 mounted on theholder 8 will start to move back and forth forwarding the tickets one by one towards the recording magnetic heat 9 along on the bed plate 5.

The ticket pushed out onto the bed plate 5 passes through under the magnetic head 9 with its magnetized face in contact with the bottom of sid head 9. When the ticket moves at a given speed, an electric current of an input signal will flow in the coil of the magnetic head 9 and a magnetic viedl proportionate to said current will be formed across the gap of te magnetic head 9 thus recording the input signal onto the ticket. The ticket with the input signal recorded thereon is pushed out by the following ticket and further comes under the printing device 11 so as to be printed by the printing type elements 12. The printed ticket will then be delviered into the ticket receiver 14, the printed tickets being piled up therein. The magnetic recording of information and printing on the tickets is performed repeatedly.

When continuous tickets 17 are used, the claw 6 for the single type ticket is raised to some extent so as not to hinder the forwarding of the continuous tickets and when the apparatus is energized by electricity, the claw 7 mounted on the holder 8 will be reciprocated horizontally forwarding the tickets in succession onto the bed plate 5 wit said claw 7 engaging with the slits 19 punched in the ticket material between the tickets and the magnetic recording an printing of tickets will be carried out in the same way as in the case of single type tickets as described above.

Next, referring to FIG. 4, in the device shown single type tickets or continuous tickets have informaion recorded thereon by input signal in the same manner as in the apparatus illustrated in FIG. 3. When such tickets pass under and in contact with the reading magnetic head 10 moving at a given speed, an electromotive force is generated in the component coil of said magnetic head 10 on account of the magnetic field of the magnetized faces of tickets 18 thus reproducing and reading out the recorded signal. At this stage, if a correct output signal is not detected, it will means that some misrecording has occured and the operation of the printing device 11 will be suspended. When a correct signal is obtained, said tickets ill further be moved towards the printing device 11 to be printed by a repetition of the same process as described for FIG. 3.

Finally, referring to FIG. 5, the operation of the invention will be described for single type tickets 16. A stack of tickets 16 is first placed in the ticket box 20. When the printing device 31 is connected to an electric source, the holder 26 of the ticket forwarding claw 24 and the stock 30 on which the magnetic heads 27 and 28 are mounted together with the ink pad 29 will start to move horizontally causing said claw 24 to push the tickets forward one by one onto the bed plate 23 right below the printing device 31, the magnetic heads 27 and 28 with the ink pad 29 being moved beyond the bottom of the printing device 31 to some extent, namely to a prefixed position A so that the printing type elements 32 are inked by te ink pad 29.

Then, the claw holder 26 and the magnetic head forwarding stock 30 begin to return with said magnetic heads 27 and 28 pasing over and in contact with the magnetized face 18 of the ticket which is stationary on the bed plate 23 . When the recording magnetic head 27 moves over said magnetized face 18 at a given speed, a current of an input signal will flow in the component coil of said magnetic head 27 with a magnetic field proportionate to said current being produced int eh gap of said magnetic head 27 and thus an input signal will be recorded on te magnetized face of the ticket.

Further, when the reading magnetic head 28 moves over and in contact with the magnetized face 18 of the ticket, an electromotive force is generated in the component coil of said reading magnetic head 28 on account of the magnetic field of said magnetized face 18 thus reproducing the recorded input singal to be read out thereby. At this stage, if an output signal is not detected, it means that some misrecording has occurred and the operation of the device 31 will be suspended.

The magnetic heads 27 and 28 further move back until they returen to the prefixed position B and the recorded ticket will then be printed by te tupe elements 32 of the printing device 31. By the repetition of abovementioned process, each of the printed tickets will be delivered intothe ticket receiver 33 and printed tickets will be piled up therein.

The printing machine according to the present invention is so constructed as to incorporate therein an input magnetic recording device together with an output magnetic reading device. Therefore, this printing machine is capable of doing the printing and magnetic recording at substantially the same time thereof dispelling any misgivings that the printed information will be different from the recorded information. It is also possible to construct this printing machine in a size almost the same as that of a conventional ticket printing machine. Even when the apparatus is as illustrated by in FIG. 5 in which magnetic recording and reading are done by the movable magnetic heads, the apparatus will be almost the same size as the other examples becase of the arrangement of said movable magnetic heads right under th inking pad.

Further, the printing machine according to the present invention, particularly the apparatus constructed as illsrated in FIG. 4 and FIG. 5, is so arranged that the recording magnetic head and the reading magnetic head re side by side thus making it possible to reproduce in immediately the input signal recorded by the recording magnetic head for reading by the reading magnetic head. Consequently, the prevention is misrecording is assured easily and effectively.

What is claimed is:

1. An apparatus for printing an on and magnetically recording on tickets having a surface a part of wich is a magnetizable material, said apparatus comprising a surface along which sai dtickets are movable, means disposed above said surface for engaging a ticket and moving it along said surface to a recording and printing position, a printing means having type elements thereon movable perpehdicularly to said surface at said recording and printing position for printing on a ticket at said position, a magnetic head means mounted on said apparatus for movement along said surface and having a magnetic recording head thereon spaced above said surface by a distance corresponding to the thickness of the ticket to be printed, said magnetic head means being movable from a position spaced along said surface from said printing position in one direction to a position past said printing position in the other direction, and an inking means on said magnetic head means on the side opposite the said surface and engageable with the type elements on said printing means as said magnetic head means moves past said printing position, whereby on te return movment of said magnetic head means a current can be passed through said recording head for recording magnetic information on a ticket at said printing position.

2. An apparatus as claimed in claim 1 in which said magnetic head means further comprises a magnetic read out head adjacent said magnetic recording head on the side thereof toward the direction of first movement of said magnetic head means for reading out magnetic information recorded during the return movement of said magnetic head means.

* * * * *